US010789337B1

(12) United States Patent
King et al.

(10) Patent No.: US 10,789,337 B1
(45) Date of Patent: Sep. 29, 2020

(54) SOFTWARE AUTHORIZATION SCALING USING DATA STORAGE

(71) Applicant: Amazon Technologies, Inc., Seattle, WA (US)

(72) Inventors: Kristopher King, Austin, TX (US); Islam Mohamed Hatem Abdulfattah Mohamed Atta, Vancouver (CA); Nafea Bshara, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 548 days.

(21) Appl. No.: 15/590,912

(22) Filed: May 9, 2017

(51) Int. Cl.
*G06F 21/62* (2013.01)
*G06F 21/10* (2013.01)
*H04L 29/08* (2006.01)
*H04L 29/12* (2006.01)

(52) U.S. Cl.
CPC .......... *G06F 21/105* (2013.01); *G06F 21/629* (2013.01); *H04L 61/2061* (2013.01); *H04L 67/1029* (2013.01); *H04L 67/1097* (2013.01); *H04L 67/141* (2013.01); *H04L 61/3005* (2013.01)

(58) Field of Classification Search
CPC . G06F 21/105; G06F 21/629; H04L 61/2061; H04L 67/1029; H04L 67/1031; H04L 67/141
See application file for complete search history.

(56) References Cited

U.S. PATENT DOCUMENTS

| 2003/0105797 | A1* | 6/2003 | Dolev | G06F 9/505 718/105 |
| 2014/0189346 | A1* | 7/2014 | Cureton | H04L 63/0846 713/155 |
| 2015/0235015 | A1* | 8/2015 | Holler | G06F 8/65 726/27 |
| 2016/0205216 | A1* | 7/2016 | Rogel | G06Q 30/06 705/26.1 |
| 2017/0126516 | A1* | 5/2017 | Tiagi | H04L 43/04 |

* cited by examiner

*Primary Examiner* — Paul E Callahan
(74) *Attorney, Agent, or Firm* — Davis Wright Tremaine LLP

(57) ABSTRACT

A licensing server object generator identifies a plurality of servers that can be used to obtain a license for accessing a feature of an application. The licensing server object generator determines, for the identified servers, network addresses and utilizes these network addresses to generate a plurality of data objects. Each data object specifies a subset of the network addresses for the servers. The licensing server object generator makes these data objects available to enable use of the data objects to obtain the license.

20 Claims, 7 Drawing Sheets

SOFTWARE AUTHORIZATION SCALING USING DATA STORAGE

BACKGROUND

Licensing servers are often used to provide software licenses to clients in order to enable these clients to utilize computing software and other applications that may require a software license. For instance, an application installed on a virtual machine instance or other computing resource provided by a computing resource service provider may access a licensing server to obtain a software license prior to enabling a user of the client device to utilize the application for its purposes. However, as demand increases for these software licenses, the demand on these licensing servers increases, which may impact the ability of these licensing servers to meet the additional demand. Addressing this added demand, such as through scaling of these licensing servers to handle this increased demand for software licenses, may be difficult.

BRIEF DESCRIPTION OF THE DRAWINGS

Various techniques will be described with reference to the drawings, in which.

DETAILED DESCRIPTION

Figure 1:
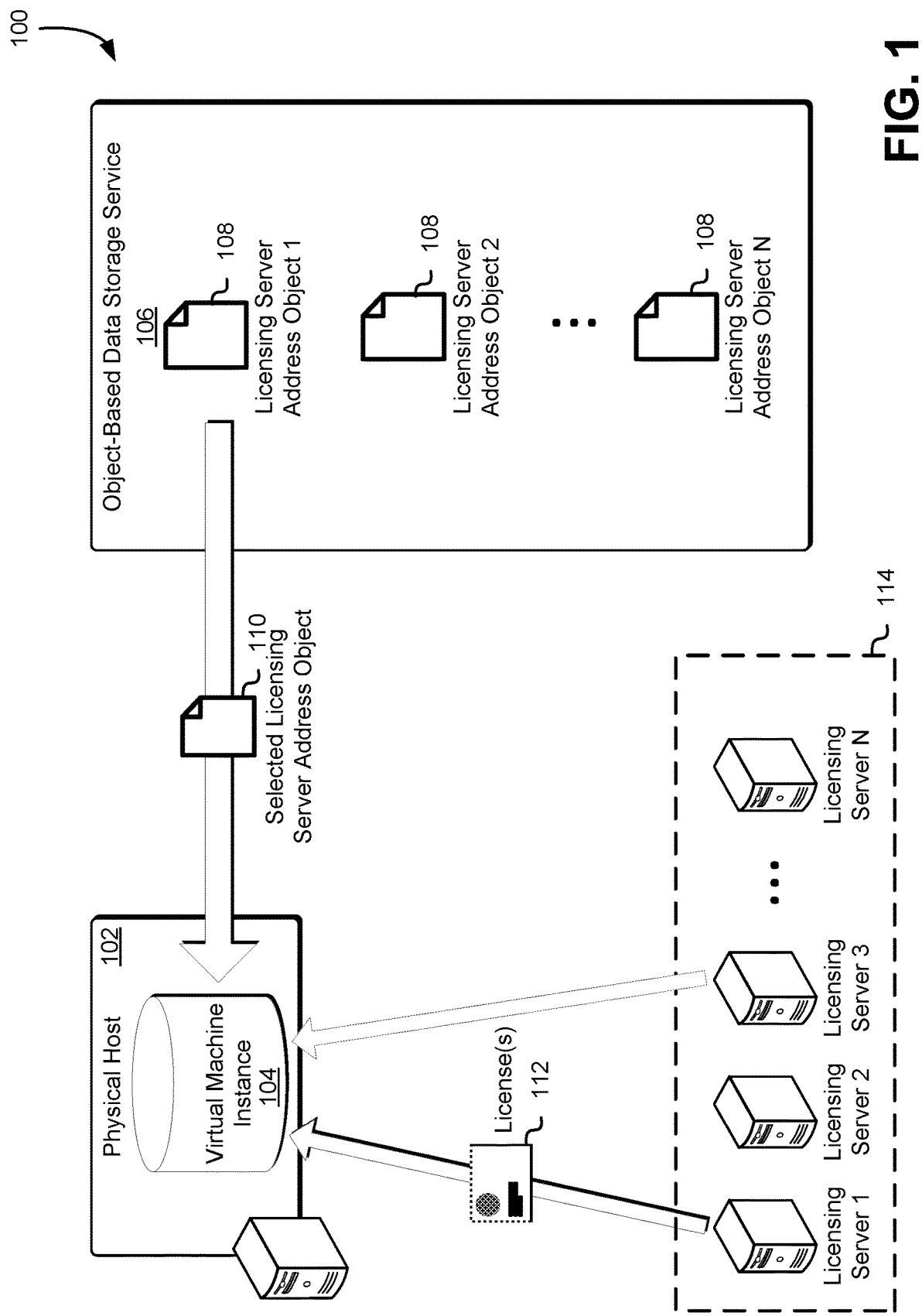
FIG. 1 shows an illustrative example of an environment in which various embodiments can be implemented.

This patent disclosure relates to the automatic scaling and balancing of software-authorization systems, such as licensing servers for providing software licenses for use by computer systems. In an example, a computing resource service provider identifies the licensing servers made available for providing software licenses to virtual machine instances and other computing resources provided by the computing resource service provider. The computing resource service provider may obtain the network addresses for each of the identified licensing servers and generate data objects that specify these network addresses. In some examples, the computing resource service provider provides a subset of the network addresses for the licensing servers in each data object such that each data object may correspond to a selection of the licensing servers available to virtual machine instances and other computing resources provided by the computing resource service provider. In some instances, the computing resource service provider may generate the data objects in a manner to balance the load to each licensing server. For example, the computing resource service provider may generate the data objects to each include a unique subset of network addresses of the licensing servers such that no data object specifies a network address of a licensing server specified in another data object. The computing resource service provider may store the generated data objects in a logical data container of an object-based data storage service to make the data objects available for use.

In some examples, a virtual machine instance or other computing resource selects, from the logical data container, a data object that specifies a subset of the network addresses for the licensing servers. The data object may be selected at random or according to an algorithm utilized by the virtual machine instance or other computing resource. The virtual machine instance or other computing resource may select, from the data object, a network address corresponding to a licensing server and may attempt to establish a connection with the selected licensing server. If the virtual machine instance or other computing resource is unable to establish a connection with the selected licensing server, the virtual machine instance or other computing resource may select another network address specified in the data object and may try to establish a connection with the licensing server corresponding to the other network address. In some instances, if the virtual machine instance or computing resource is unable to establish a connection with any of the licensing servers corresponding to the network addresses specified in the data object, the virtual machine instance or other computing resource may obtain another data object from the logical data container. If the virtual machine instance or other computing resource establishes a connection with a licensing server, the virtual machine instance or other computing resource may obtain a software license from the licensing server and use it accordingly.

The licensing servers may record usage data that may specify requests processed by the licensing servers in providing their respective software licenses to virtual machine instances and other computing resources. In an example, the computing resource service provider, through a data object generator, obtains the usage data from the licensing servers and evaluates this usage data to identify how each of the licensing servers are being utilized. For instance, the computing resource service provider may determine whether a particular licensing server is being accessed at a rate that is greater than the other licensing servers of the fleet. Similarly, the computing resource service provider may utilize the usage data to identify any licensing servers that are experiencing outages or other issues impacting performance of these licensing servers. Based on the usage data for the licensing servers, the computing resource service provider may determine whether the data objects are to be updated to redistribute or otherwise balance the load to other licensing servers of the fleet. For instance, the computing resource service provider may update the data objects to remove or reduce references to the network address of a heavily loaded licensing server while increasing the references to the network address of licensing servers that have not been used extensively in proportion to the other licensing servers of the fleet.

In this manner, a computing resource service provider may scale the usage of licensing servers based on the requests obtained by these licensing servers to obtain software licenses. In addition, the techniques described and suggested in this disclosure enable additional technical advantages. For instance, because the computing resource service provider may evaluate usage data from the licensing servers to determine how each licensing server is being utilized, the computing resource service provider may determine, based on the usage data, whether to provision additional licensing servers to handle incoming requests to obtain a software license. The computing resource service provider may update the data objects to introduce the network address of the newly provisioned licensing servers to balance the load for the licensing servers of the fleet.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of an environment 100 in which various embodiments can be implemented. In the environment 100, a virtual machine instance 104 instantiated on to a physical host 102 provided by a computing resource service provider accesses an object-based data storage service 106 to obtain a licensing server address data object 108. The physical host 102 may comprise a plurality of hardware components. For instance, the physical host 102 may include one or more processors, several random access memory (RAM) chipsets and one or more storage devices (e.g., solid-state drives or magnetic disk drives) configured to persistently store and instantiate the virtual machine instance 104. The virtual machine instance 104 may permit a customer or other user to access an operating system and a variety of applications that may enable the customer or other user to perform certain functions (e.g., maintain one or more databases, store client information, develop web applications, etc.). While virtual machine instances 104 are utilized throughout the present disclosure for the purpose of illustration, the techniques described herein may be adapted for use with other resources that may be used by a customer or other user to access the variety of applications that may enable the customer or other user to perform certain functions. For instance, customers and other users may utilize a physical computer system, a mobile device (e.g., smartphone, etc.), a laptop computer, a software container (e.g., a lightweight virtualization instance running under a computer system instance that includes programs, data, and system libraries), and the like to access the variety of applications.

In some instances, if a customer or other user selects, via the virtual machine instance 104, an application for execution, the application may determine whether a software license is available that can be used to authorize the customer or other user to utilize the application. For instance, in an embodiment, in response to a request to initiate the application or upon instantiation of the virtual machine instance 104 onto the physical host 102, the application accesses an object-based data storage service 106 to obtain a licensing server address data object 108. The object-based data storage service 106 may operate using computing resources (e.g., databases) that enable the object-based data storage service 106 to locate and retrieve data quickly, so as to allow data to be provided in responses to requests for the data. For example, the object-based data storage service 106 may maintain stored data in a manner such that, when a request for a data object, such as a licensing server address data object 108, is retrieved, the data object can be provided (or streaming of the data object can be initiated) in a response to the request. Data stored in the object-level data storage service 106 may be organized into data objects, such as the licensing server address data objects 108 illustrated in FIG. 1. While an object-based data storage service 106 is used throughout the present disclosure for the purpose of illustration, licensing server address information may be maintained using other resources and services. For instance, the licensing server address information may be stored as distinct entries in a database. Alternatively, the licensing server address data objects 108 may be maintained in an electronic file system, block storage system, or other type of storage service. Further, while data objects are used throughout the present disclosure for the purpose of illustration, other data records may be used to specify network addresses and other information regarding available licensing servers 114 as described below. Such data records may include digital spreadsheets, digital text documents, database entries, and the like.

The data objects may have arbitrary sizes except, perhaps, for certain constraints on size. Thus, the object-based data storage service 106 may store numerous data objects of varying sizes. The object-based data storage service 106 may operate as a key value store that associates data objects with identifiers of the data objects which may be used by the customer or other user to retrieve or perform other operations in connection with the data objects stored by the object-based data storage service 106. As used herein, a data object is used broadly and does not necessarily imply any particular structure or relationship to other data. A data object may be, for instance, simply a sequence of bits. Typically, such logical data structures may be created to meet certain business requirements of customers of the computing resource service provider and are independently of the physical organization of data stored in the object-based data storage service 106.

In some embodiments, the computing resource service provider maintains the licensing server address data objects 108 in one or more logical data containers of the object-based data storage service 106. As used herein, the term "logical data container" refers to a grouping of data objects. For example, data objects created for a specific purpose or during a specific period of time may be stored in the same logical data container. Each logical data container may include nested data containers or data objects and may be associated with a set of policies such as size limit of the container, maximum number of data objects that may be stored in the container, expiration date, access control list and the like. In various embodiments, logical data containers may be created, deleted or otherwise modified by the computing resource service provider via application programming interface (API) requests, by a system administrator or by the data storage system, for example, based on configurable information. In some instances, the licensing server address data objects 108 may be maintained in a single logical data container or in various logical data containers based at least in part on different criteria. For instance, the licensing server address data objects 108 may be organized based at least in part on the corresponding data region in which the licensing servers specified in the data objects are located.

In an embodiment, to generate the licensing server address data objects 108, the computing resource service provider identifies the licensing servers 114 available for providing a software license 112 to virtual machine instances and other computing resources that may utilize the software license 112 to provide authenticated access to users of the virtual machine instances and other computing resources. These licensing servers 114 may be maintained in various data regions. Each licensing server 114 may comprise computing hardware, software, and other applications that may process incoming requests from computing resources of the computing resource service provider to provide software licenses 112 to the computing resources. Each licensing server 114 may be accessed via a network address, such as a Uniform Resource Identifier (URI), an Internet Protocol (IP) address, a port number, and/or any address or component thereof that may be used to contact the licensing server electronically. It should be noted that the term "licensing server" or just "server" is intended to include within its scope any node accessible on a network and operable to provide software licenses and such nodes may be implemented in a variety of ways, such as by a virtual machine instance, physical computer system, software container, and/or other such system. While software licenses and other licenses are used throughout the present disclosure for the purpose of illustration, the computing resource service provider may provide other types of authorization for use of applications and other resources.

The computing resource service provider may distribute the network addresses of the licensing servers 114 among one or more licensing server address data objects 108 based at least in part on certain criteria. For instance, the computing resource service provider may generate the licensing server address data objects 108 such that network addresses can be distributed equally among the data objects 108. Further, each licensing server address data object 108 may include a unique subset of the network addresses of the licensing servers 114. For example, each licensing server address data object 108 may specify one or more network addresses of the licensing servers 114. These one or more network addresses may be unique to the licensing server address data object 108 and may not be specified in the other licensing server address data objects. Alternatively, the computing resource service provider may specify different combinations of network addresses for the licensing servers 114 among the various licensing server address data objects 108 such that each network address is specified at the same frequency as every other network address among the licensing server address data objects 108.

In some embodiments, the computing resource service provider evaluates usage data from the licensing servers 114 to determine the load on each of the licensing servers 114. Based at least in part on this usage data, the computing resource service provider may distribute the network addresses for the licensing servers 114 to balance usage of the licensing servers 114. For example, the computing resource service provider may specify a network address for a licensing server 114 experiencing high usage rates at a lower frequency while specifying a network address for a licensing server 114 that experiences lower usage rates at a higher frequency. Thus, the computing resource service provider may use the distribution of the network addresses among the licensing server address data objects 108 to load balance these licensing servers 114 based at least in part on the usage data provided by the licensing servers 114. The computing resource service provider may store the licensing server address data objects 108 within the object-based data storage service 106 in one or more logical data containers, as described above.

When the application being initiated via the virtual machine instance 104 or other computing resource accesses the object-based data storage service 106, the application may identify the available licensing server address data objects 108 and select a data object 110 at random. Alternatively, the application may utilize one or more heuristics for selecting a data object 110. For instance, the application may identify a usage rate for each of the data objects and select a data object 110 with the lowest usage rate in order to minimize the load to the licensing servers specified therein. In some instances, the application may identify the data region in which the virtual machine instance 104 or other computing resource through which the application is operating. The application may use this information to select a logical data container or a set of data objects that correspond to licensing servers 114 in the same data region. The application may then select a licensing server address data object 108 from the object-based data storage service 106, resulting in a selected licensing server address data object 110. In some embodiments, the application submits a request to the object-based data storage service 106 to obtain a licensing server address data object 108. In response to the request, the object-based data storage service 106 may select a licensing server address data object 108 based at least in part on the criteria described above. For instance, the object-based data storage service 106 may select, at random or through use of one or more heuristics, a licensing server address data object 108 from a logical data container. These heuristics may be similar to those described above, whereby the object-based data storage service 106 may select a data object 110 based at least in part on usage data for the data objects maintained by the object-based data storage service 106 and the data region in which the corresponding licensing servers 114 are maintained.

The application, in response to receiving a selected licensing server address data object 110 from the object-based data storage service 106, may select a network address from the selected licensing server address data object 110. For instance, if the selected licensing server address data object 110 includes a listing of network addresses for a subset of the licensing servers 114 available, the application may select the first network address specified in the selected licensing server address data object 110. Alternatively, the application may select a network address at random. The application may use the selected network address to establish a network connection with a licensing server 114 corresponding to the network address. For example, the application may submit an application layer (e.g., HyperText Transfer Protocol Secure (HTTPS), file transfer protocol, etc.) request to the selected licensing server 114 to establish a secure network communications channel, such as a Transport Layer Security/Secure Sockets Layer (TLS/SSL) secure channel. If the application establishes a communications channel with the selected licensing server 114, the application may submit a request to obtain a software license 112 that can be used to provide authenticated access to the features of the application to the user of the virtual machine instance 104 or other computing resource. However, if the application is unable to establish a communications channel with the selected licensing server 114, the application may select another network address from the licensing server address data object 108 and attempt to establish a communications channel with the licensing server corresponding to the newly selected licensing server. If there are no other network addresses in the selected licensing server address data object 110, the application may obtain another licensing server address data object 108 from the object-based data storage service 106.

The application may obtain the software license 112 from a licensing server 114 to which it has established a communications channel. The application verify that the obtained software license 112 and, if so, enable a user of the virtual machine instance 104 or other computing resource to utilize the application for its needs. In an embodiment, the licensing server 114 that received the request from the application records the request in a log or other data structure that may be used to denote usage data for the licensing server 114. Each licensing server 114 of the fleet of licensing servers 114 may maintain its own log or other data structure for specifying usage information corresponding to received requests to obtain a software license 112. Alternatively, the licensing servers 114 may update a usage data log for the fleet of licensing servers 114 to denote usage data for each licensing server 114.

At any time, the object-based data storage service 106 may obtain the usage data from the one or more licensing servers 114. For instance, the object-based data storage service 106 may periodically query the licensing servers 114 to obtain the individual usage data logs from the licensing servers 114. Alternatively, the object-based data storage service 106 may access the usage data log corresponding to the fleet of licensing servers 114 to obtain the usage data for the licensing servers 114. In some instances, the object-based data storage service 106 may obtain the usage data in response to a triggering event. For instance, if the object-based data storage service 106 detects that a licensing server 114 is inoperative or is experiencing unusual latency in responding to requests to obtain a software license 112, the object-based data storage service 106 may obtain the usage data for the licensing servers 114.

The object-based data storage service 106 may evaluate the usage data from the licensing servers 114 to determine whether to re-balance the distribution of requests to obtain the software license 112. For instance, based at least in part on usage data obtained from the licensing servers 114, the object-based data storage service may determine whether any of the licensing servers 114 are being underutilized or are experienced elevated usage. Utilizing this usage data, the object-based data storage service 106 may modify the licensing server address data objects 108 to redistribute the network addresses of the licensing servers 114. For example, if the object-based data storage service 106 determines that a licensing server is being utilized at a greater frequency than a maximum threshold established by the object-based data storage service 106, the object-based data storage service 106 may reduce the instances of the licensing server's network address among the licensing server address data objects 108 to decrease the probability of the licensing server 114 being selected by an application. Similarly, if the object-based data storage service 106 determines that a licensing server 114 is being underutilized, the object-based data storage service 106 may increase the instances of the licensing server's network address among the licensing server address data objects 108 to increase the probability of the licensing server 114 being selected.

In some embodiments, the object-based data storage service 106 utilizes the usage data from the licensing servers 114 to determine whether to provision additional licensing servers 114 in order to balance the load among the fleet. For instance, if the object-based data storage service 106 determines that the frequency of use for the fleet of licensing servers 114 exceeds a maximum frequency threshold, the object-based data storage service 106 may provision additional licensing servers 114 to reduce the load to the other licensing servers 114 of the fleet.

The object-based data storage service 106 may obtain the network addresses of the newly provisioned licensing servers and modify one or more licensing server address data objects 108 to specify these network addresses. If the object-based data storage service 106 detects that a licensing server 114 is disabled or otherwise incapable of processing requests to obtain the software license 112, the object-based data storage service 106 may modify one or more licensing server address data objects 108 to remove the network address of the affected licensing server and redistribute the network addresses for the other licensing servers 114 among the licensing server address data objects 108 to balance the load among the remaining licensing servers 114.

Figure 2:
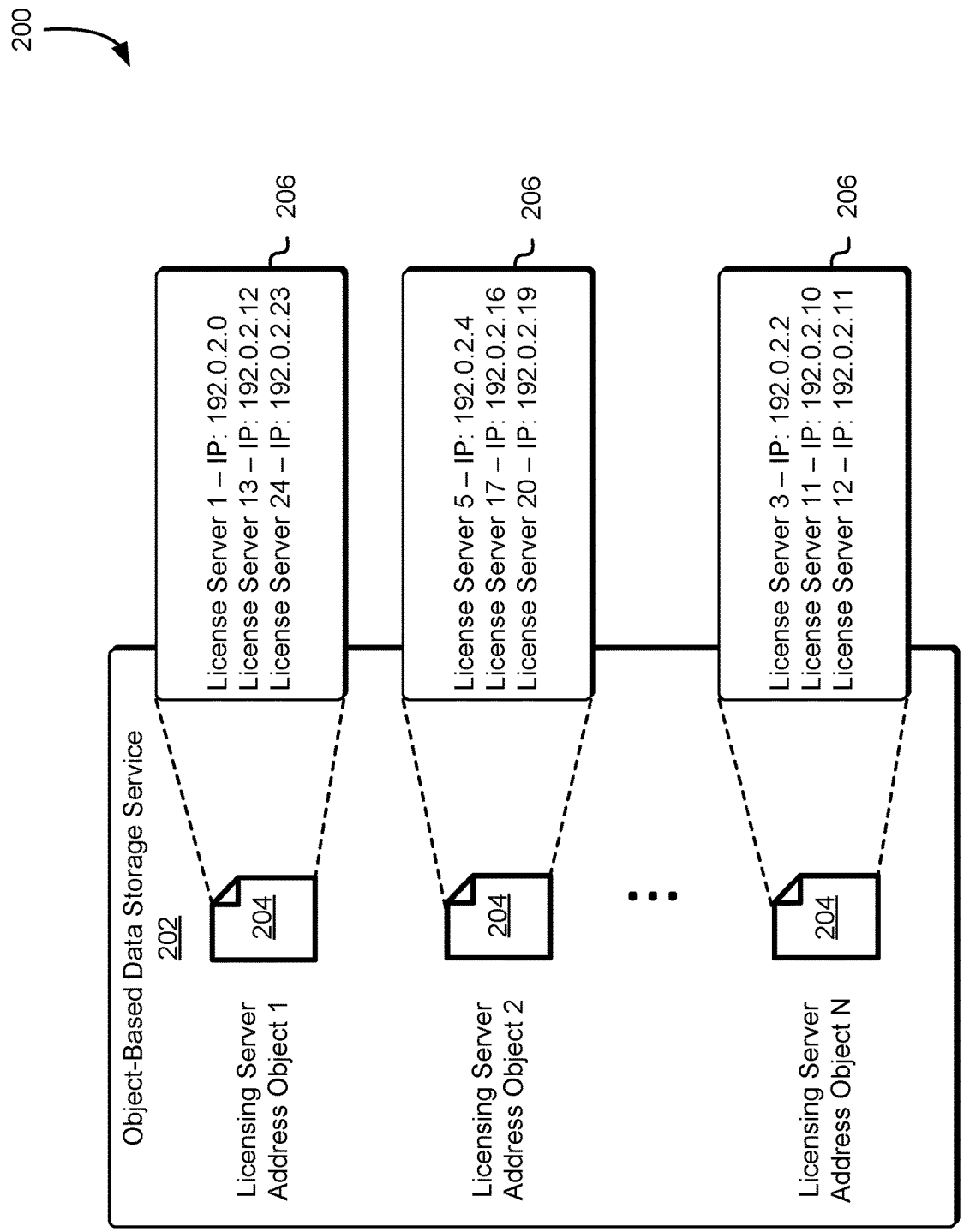
FIG. 2 shows an illustrative example of an environment in which licensing server address objects specify different network addresses of licensing servers available for obtaining software licenses in accordance with at least one embodiment.

As noted above, the object-based data storage service may maintain one or more licensing server address data objects that may be used by applications of a virtual machine instance or other computing resource to identify a licensing server that can be accessed to obtain a software license. Each of the licensing server address data objects may include an ordering of network addresses for licensing servers available to the application for obtaining the software license. The application may select a network address from the licensing server address data object and attempt to establish a communications channel with the corresponding licensing server. Accordingly, FIG. 2 shows an illustrative example of an environment 200 in which licensing server address data objects 204 specify different network addresses of licensing servers available for obtaining software licenses in accordance with at least one embodiment.

In the environment 200, the object-based data storage service 202 provides, to applications of virtual machine instances and other computing resources, one or more licensing server address data objects 204. Each licensing server address data object 204 may specify licensing server network addresses 206 corresponding to licensing servers available to the application to obtain a software license for use by the application. In some instances, each of the licensing server address data objects 204 may include an ordering such as a list, table, matrix, and the like. The object-based data storage service 202 may obtain, from the licensing servers, the network addresses of the licensing servers that are available to process incoming requests to obtain a particular software license. The object-based data storage service 202 may generate the one or more licensing server address data objects 204 and distribute the network addresses among the data objects 204 to balance the potential load among the various licensing servers of the fleet. For example, in an embodiment, the object-based data storage service 202 specifies, in each licensing server address data object 204, a unique subset of the network addresses 206 corresponding to the licensing servers. As illustrated in FIG. 2, each licensing server address data object 204 specifies unique network addresses for the licensing servers and no network address is repeated among the licensing server address data objects 204. Alternatively, the object-based data storage service 202 may distribute the network addresses 206 of the licensing servers according to one or more heuristics such that there is a greater probability of the licensing servers experiencing a balanced load over time. For example, the object-based data storage service 202 may specify the network address of a licensing server within various licensing server address data objects 204 at different positions in the ordering specified in these data objects 204. This may cause an increased or decreased rate of usage for the licensing server, depending on where in the ordering the network address of the licensing server is specified.

An application obtaining a licensing server address data object 204 from the object-based data storage service 202 may select a network address from the licensing server address data object 204 and attempt to establish a communications channel with the corresponding licensing server. If the communications channel is not established, the application may select another network address from the licensing server address data object 204 and attempt to establish a communications channel with the corresponding licensing server. This may continue until a communications channel is successfully established with a licensing server. If the application is unable to establish a communications channel with any of the licensing servers corresponding to the network addresses specified in a licensing server address data object 204, the application may obtain a different licensing server address data object from the object-based data storage service 202. Since each licensing server address data object 204 may specify a unique subset of network addresses of the licensing servers, the application may attempt to establish a communications channel with other licensing servers.

The object-based data storage service 202 may obtain usage data from the fleet of licensing servers to determine the frequency at which each of the licensing servers are utilized. Based at least in part on this usage data, the object-based data storage service 202 may determine whether to redistribute the network addresses 206 for the licensing servers among the licensing server address data objects 204. For example, if, based at least in part on the usage data, the object-based data storage service 202 determines that a particular licensing server is being utilized at a rate greater than a maximum frequency threshold established by the computing resource service provider, the object-based data storage service 202 may modify one or more licensing server address data objects 204 to reduce the frequency at which the network address for the affected licensing server is specified in these data objects. This may include removing instances of the network address from the licensing server address data objects 204, moving the network address to a lower position in an ordering of network addresses within the data objects 204, and the like. Similarly, if a licensing server is underutilized (e.g., utilized at a rate less than a minimum threshold frequency defined by the computing resource service provider), the object-based data storage service 202 may increase the number of instances the network address for the licensing server is specified in the data objects 204.

In an embodiment, if the computing resource service provider provisions one or more licensing servers in addition to the existing fleet of licensing servers, the object-based data storage service 202 can modify the licensing server address data objects 204 to specify the network addresses of the newly provisioned licensing servers. For example, the object-based data storage service 202 may distribute the new network addresses among the existing licensing server address data objects 204 such that no new network address is specified in more than one data object. Alternatively, the object-based data storage service 202 may generate one or more new licensing server address data objects 204 to specify these new network addresses. The distribution of these new network addresses may be performed such that the probability of a particular licensing server being utilized by an application is equal among the licensing servers of the fleet.

In some embodiments, each licensing server address data object 204 includes metadata that specifies instructions and/or parameters for selecting other licensing server address data objects 204 in subsequent requests. For instance, an application may select a licensing server address data object 204 from the object-based data storage service 202 and obtain the metadata from the selected licensing server address data object 204. The application may utilize the instructions in the metadata to identify the licensing server address data object 204 and select a different licensing server address data object 204 in future requests to obtain a licensing server address data object 204.

Figure 3:
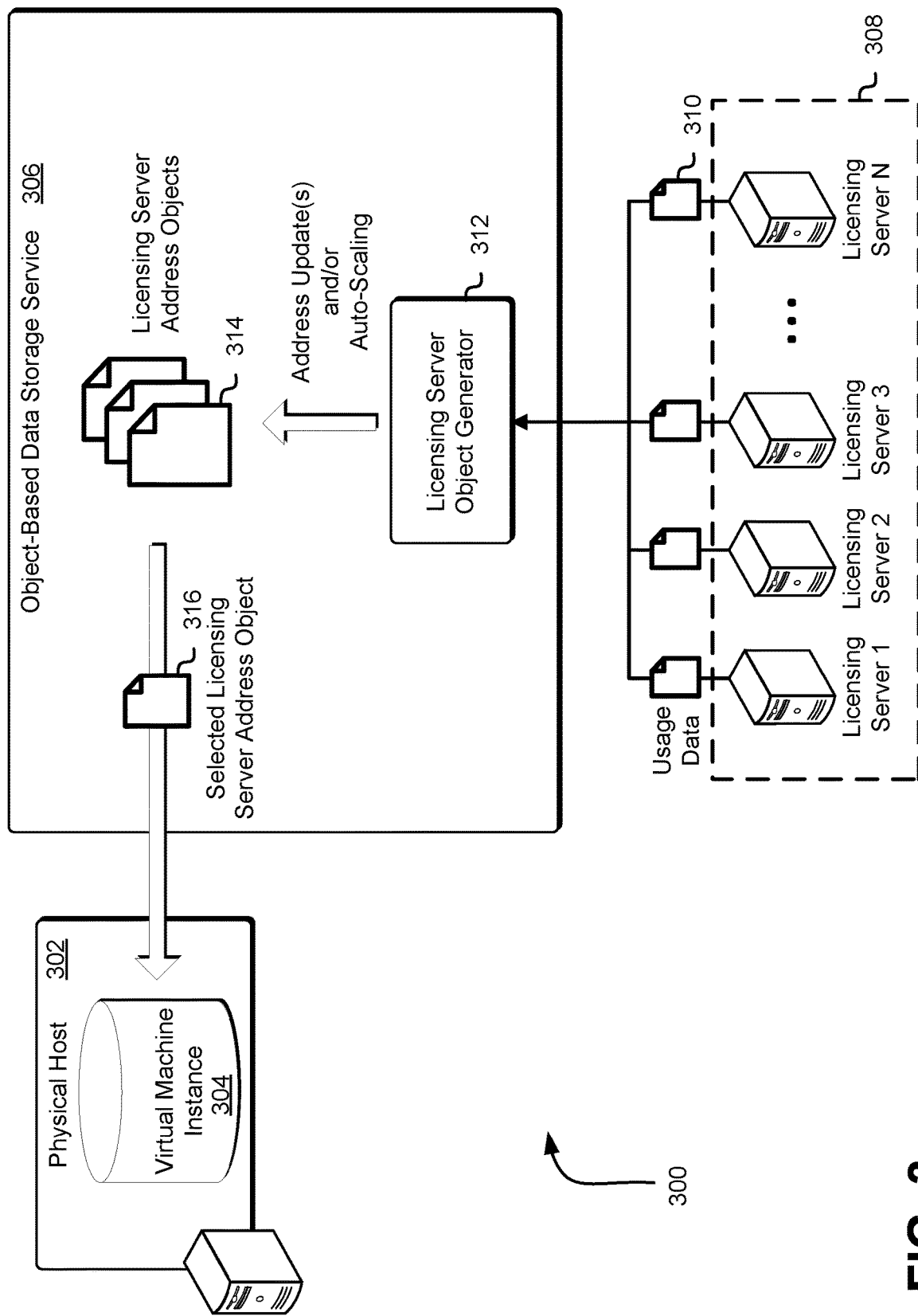
FIG. 3 shows an illustrative example of an environment in which a licensing server object generator evaluates usage data from licensing servers to update or generate licensing server address objects for use by virtual machine instances in accordance with at least one embodiment.

As noted above, the object-based data storage service may obtain usage data from the licensing servers, which may specify the frequency at which each licensing server processes requests to obtain a software license. The object-based data storage service may evaluate the usage data to determine whether a redistribution of the network addresses specified in the licensing server address data objects maintained by the object-based data storage service is needed in order to balance the load among the various licensing servers. Accordingly, FIG. 3 shows an illustrative example of an environment 300 in which a licensing server object generator 312 of an object-based data storage service 306 evaluates usage data 310 from licensing servers 308 to update or generate licensing server address data objects 314 for use by virtual machine instances 304 in accordance with at least one embodiment.

In the environment 300, a virtual machine instance 304 instantiated on to a physical host 302 transmits, on behalf of an application through the virtual machine instance 304, a request to an object-based data storage service 306 to obtain a licensing server address data object 316. In response to the request, the object-based data storage service 306 may select a licensing server address data object 316 from a logical data container that includes various licensing server address data objects 314 specifying network addresses of licensing servers 308 that may provide a software license usable by the application. The object-based data storage service 306 may utilize a licensing server object generator 312 to generate the various licensing server address data objects 314 that are provided by the object-based data storage service 306 to virtual machine instances and other computing resources. The licensing server object generator 312 may include one or more computer systems, applications, or processes that identify the licensing servers 308 made available by a computing resource service provider for providing software licenses to virtual machine instances and other computing resources. Further, the licensing server object generator 312 may obtain, from the identified licensing servers 308, network addresses corresponding to these licensing servers 308. It should be noted that while the licensing server object generator 312 is illustrated and described extensively as being a component of the object-based data storage service 306, the licensing server object generator 312 may be a stand-alone service provided by the computing resource service provider or a component of another stand-alone service that can communicate with the object-based data storage service 306.

In an embodiment, the licensing server object generator 312 creates the various licensing server address data objects 314 that are maintained by the object-based data storage service 306 such that each licensing server address data object specifies a subset of the network addresses obtained by the licensing server object generator 312. The number of licensing server address data objects 314 created by the licensing server object generator 312 may be determined based at least in part on a number of instances of an application installed on virtual machine instances and other computing resources provided by the computing resource service provider. For example, in order to meet the demand in obtaining software licenses for a particular application, the licensing server object generator 312 may generate licensing server address data objects 314 in proportion to the application installations among the virtual machine instances and other computing resources and the anticipated demand. As an example, the licensing server object generator 312 can divide the network addresses of the licensing servers 308 into smaller subsets and generate a licensing server address data object corresponding to each subset. Further, by evaluating the anticipated demand for the licensing server address data objects 314, the licensing server object generator 312 may scale the licensing server address data objects 314 by creating additional licensing server address data objects that include alternative combinations of network addresses. The licensing server object generator 312 may generate these data objects in a manner that also provides a greater probability of an even distribution of load among the licensing servers 308. For example, the licensing server object generator 312 may specify each network address uniformly among the various licensing server address data objects 314.

The licensing server address data objects 314 may be organized into one or more logical data containers. For instance, if the licensing servers 308 are offered via more than one data region, the licensing server object generator 312 may generate a logical data container corresponding to each data region that has at least one licensing server 308 that provides software licenses to virtual machine instances and other computing resources. Within each logical data container, the licensing server object generator 312 may create licensing server address data objects 314 that specify network addresses of licensing servers in the corresponding data region. Thus, in response to a request to obtain a licensing server address data object, the object-based data storage service 306 may identify the data region in which the application submitting the request is being executed and access the corresponding logical data container.

Each licensing server 308 may maintain a usage data log 310, which the licensing server 308 may use to specify requests received by the licensing server 308 to obtain a software license. The entries in the usage data log 310 may specify at least an identifier corresponding to a requestor (e.g., the virtual machine instance, computing resource, user, etc.), a timestamp corresponding to when the request was received, and an indication as to whether the request was fulfilled. Alternatively, the licensing servers 308 may update a single usage data log 310 that is maintained by a service that provisions the licensing servers for providing the software licenses to requesting entities.

In an embodiment, the licensing server object generator 312 obtains, from the licensing servers 308 or from the service that provisions the licensing servers 308, the one or more usage data logs 310 for processing. For instance, the licensing server object generator 312 may periodically access the licensing servers 308 or the service that provisions the licensing servers 308 to obtain the usage data logs 310. Alternatively, the licensing server object generator 312 may obtain the usage data logs 310 in response to a triggering event, such as detection of a licensing server outage or other event that impacts the performance of the licensing servers 308. In some instances, the licensing servers 308 may be configured to transmit the usage data logs 310 to the licensing server object generator 312 at certain time intervals as defined by the licensing server object generator 312 or the computing resource service provider.

The licensing server object generator 312 may evaluate the one or more usage data logs 310 from the licensing servers 308 to determine whether the load among the various licensing servers 308 is balanced (e.g., each licensing server 308 experiences a load that is in between a minimum and maximum threshold request frequency). If the licensing server object generator 312 determines that a licensing server 308 is experiencing a load, over a period of time, that exceeds the maximum threshold request frequency, the licensing server object generator 312 may perform one or more operations to re-distribute the load among the licensing servers 308 of the fleet. For example, the licensing server object generator 312 may modify the licensing server address data objects 314 to reduce the number of instances the network address of the licensing server is specified. This may reduce the probability of the licensing server being selected in order to obtain a software license. Alternatively, the licensing server object generator 312 may generate additional licensing server address data objects 314, each of which may specify the network addresses of licensing servers that are not experiencing an elevated load. This may also result in a reduced probability of the affected licensing server 308 being selected by a virtual machine instance or other computing resource, reducing the load to the affected licensing server 308.

If the licensing server object generator 312 determines that a licensing server is being underutilized (e.g., the load of the licensing server is below a minimum threshold request frequency), the licensing server object generator 312 may modify the licensing server address data objects 314 to increase the number of instances the network address of the licensing server is specified. This may increase the probability that the network address of the licensing server is selected by the virtual machine instances and other computing resources, thereby increasing the load of the licensing server. Alternatively, the licensing server object generator 312 may generate additional licensing server address data objects 314 and specify, within these data objects, the network address of the underutilized licensing server. This may also have the effect of increasing the load to the underutilized licensing server.

In an embodiment, if a licensing server becomes disabled and is unable to provide software licenses to requestors, the licensing server object generator 312 will obtain the usage data logs 310 from the licensing servers 308 and determine the probable load to the remaining licensing servers 308 to determine whether a redistribution of load is to be performed. For instance, the licensing server object generator 312 may identify the load for each of the active licensing servers 308 and extrapolate this to include a distribution of the load of the now disabled licensing server. The licensing server object generator 312 may modify the licensing server address data objects 314 to remove instances of the network address of the disabled licensing server. Further, if a redistribution of load is needed to prevent any licensing server from experiencing an elevated load, the licensing server object generator 312 may modify the licensing server address data objects 314 to increase or decrease the instances of network addresses for the licensing servers according to the predicted load for each of these licensing servers.

If a licensing server is added to the fleet of licensing servers 308, the licensing server object generator 312 may obtain the usage data logs 310 for the pre-existing licensing servers 308 to determine the load to these licensing servers 308. Based at least in part on the load for these pre-existing licensing servers, the licensing server object generator 312 may modify the licensing server address data objects 314 to incorporate the network address of the newly added licensing server into the licensing server address data objects 314 while adding or removing instances of network addresses of the pre-existing licensing servers according to the expected load on these licensing servers after the newly added licensing server has been incorporated into the fleet.

Figure 4:
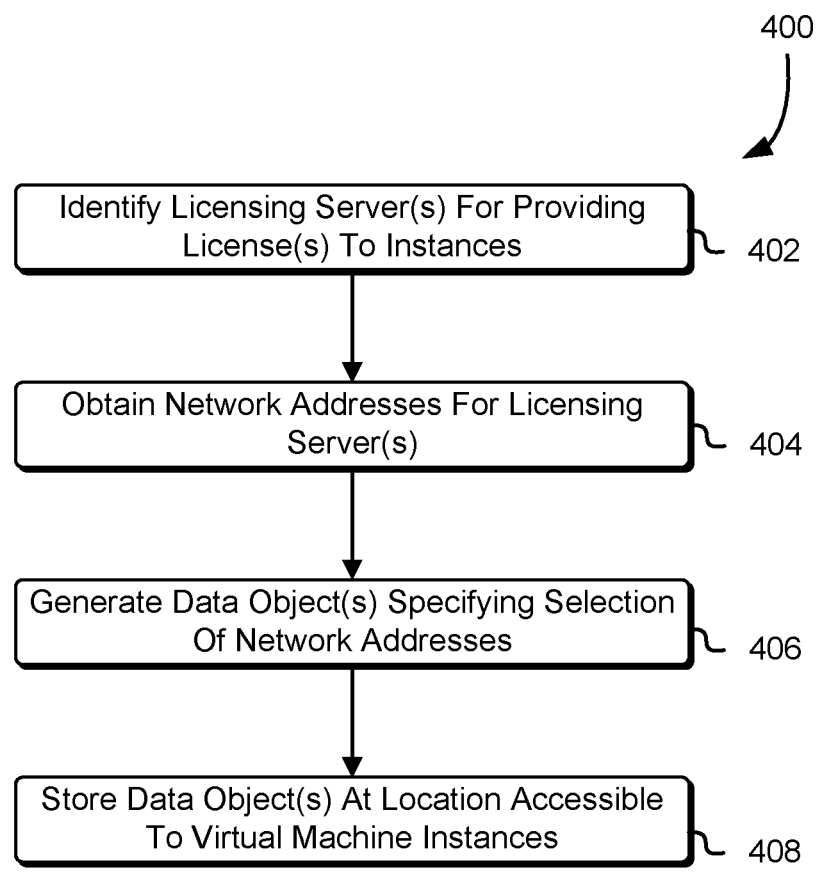
FIG. 4 shows an illustrative example of a process for generating data objects specifying network addresses of available licensing servers in accordance with at least one embodiment.

As noted above, a licensing server object generator may generate licensing server address data objects that each specifies a subset of network addresses corresponding to licensing servers made available by a computing resource service provider to provide software licenses for use by virtual machine instances and other computing resources. To generate the licensing server address data objects, the licensing server object generator may identify the licensing servers made available for obtaining the licensing servers and obtain the network addresses for these licensing servers. The licensing server address data objects may be stored within the object-based data storage service to enable virtual machine instances and other computing resources to access these data objects. Accordingly, FIG. 4 shows an illustrative example of a process 400 for generating data objects specifying network addresses of available licensing servers in accordance with at least one embodiment. The process 400 may be performed by the aforementioned licensing server object generator, which may obtain the network addresses for licensing servers of a fleet and use these network addresses to generate the licensing server address data objects.

A licensing server object generator may identify 402 one or more licensing servers provided by a computing resource service provider for providing software licenses to virtual machine instances and other computing resources. The licensing server object generator may receive a request from the computing resource service provider or may be executed by the computing resource service provider to access the fleet of licensing servers to identify the licensing servers made available to provide a particular software license. The licensing server object generator may obtain, from the computing resource service provider, a database that specifies identifiers for the licensing servers that are available for providing a particular software license. The licensing server object generator may utilize this database to identify the licensing servers. Alternatively, the computing resource service provider may provide an identifier corresponding to the software license being provided. The licensing server object generator may query each licensing server to determine whether the licensing server makes available a software license having the provided identifier. If so, the licensing server object generator may identify the licensing server as being available to provide the software license.

The licensing server object generator, once it has identified the licensing servers made available to provide a software license, may obtain 404 the network addresses for each of the identified licensing servers. A network address may include a URI of the licensing server, an IP address, or any network address that may be used to contact the licensing server electronically. The licensing server object generator may transmit an API request to each identified licensing server to receive a notification from the licensing server that indicates the network address for the licensing server. Alternatively, the licensing server object generator may obtain the network addresses for the identified licensing servers from the computing resource service provider or other service responsible for the maintenance of the licensing servers.

Using the obtained network addresses for the identified licensing servers, the licensing server object generator may generate 406 one or more data objects specifying a selection or subset of the obtained network addresses. The number of licensing server address data objects created by the licensing server object generator may be determined based at least in part on a number of instances of an application installed on virtual machine instances and other computing resources provided by the computing resource service provider. For example, in order to meet the demand in obtaining software licenses for a particular application, the licensing server object generator may generate licensing server address data objects in proportion to the application installations among the virtual machine instances and other computing resources and the anticipated demand. The licensing server object generator may divide the network addresses of the licensing servers into smaller subsets and generate a licensing server address data object corresponding to each subset. Further, by evaluating the anticipated demand for the licensing server address data objects, the licensing server object generator may scale the licensing server address data objects by creating additional licensing server address data objects that include alternative combinations of network addresses. The licensing server object generator may generate these data objects in a manner that also provides a greater probability of an even distribution of load among the licensing servers.

The licensing server object generator may store 408 the newly generated licensing server address data objects in an object-based data storage service to make these data objects accessible to virtual machine instances and other computing resources. In some embodiments, the licensing server object generator stores the licensing server address data objects in a logical data container of the object-based data storage service, as described above. Alternatively, the licensing server object generator may generate a logical data container corresponding to each data region where a licensing server is made available. The licensing server object generator may organize the licensing server address data objects according to the data region of the licensing servers specified and store the licensing server data objects into the corresponding logical data containers. In some embodiments, the licensing server object generator transmits a PUT request API call to a data storage service, such as the object-based data storage service, to cause the data storage service to store the licensing server address data objects.

Figure 5:
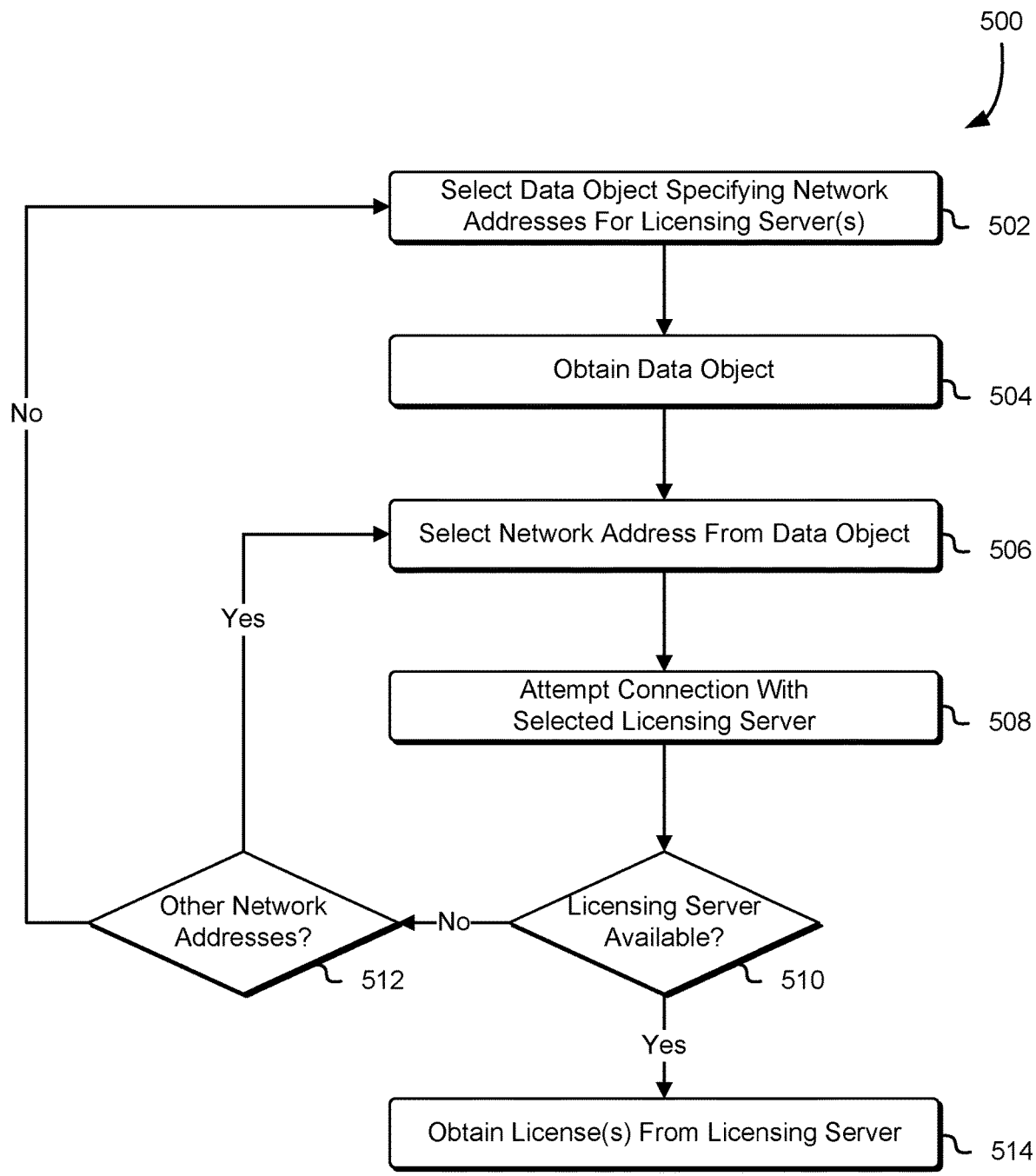
FIG. 5 shows an illustrative example of a process for obtaining a data object specifying network addresses of licensing servers to obtain one or more software licenses from a licensing server in accordance with at least one embodiment.

As noted above, a virtual machine instance or other computing resource may include an application or other software program that may utilize a software license to grant users access to features of the application or other software program. For instance, if a user executes, via the virtual machine instance or other computing resource, an application that requires a software license, the application may obtain a licensing server address data object from the object-based data storage service and select a network address from the data object to access a licensing server. The application may obtain the software license from the licensing server and provide the features of the application to the user. Accordingly, FIG. 5 shows an illustrative example of a process 500 for obtaining a data object specifying network addresses of licensing servers to obtain one or more software licenses from a licensing server in accordance with at least one embodiment. The process 500 may be performed by any application installed on a virtual machine instance or other computing resource that may obtain a licensing server address data object in order to identify a licensing server for obtaining a software license.

When a user of a virtual machine instance or other computing resource selects an application to be executed on the virtual machine instance or other computing resource, the application may access an object-based data storage service to identify one or more licensing server address data objects. The application may select 502 a licensing server address data object from those identified in the object-based data storage service. For instance, the application may select a data object at random, possibly from a list of known data objects. Alternatively, the application may utilize one or more heuristics for selecting a data object. For instance, the application may identify a usage rate for each of the data objects and select a data object with the lowest usage rate in order to minimize the load to the licensing servers specified therein. In some instances, the application may identify the data region in which the virtual machine instance or other computing resource through which the application is operating. The application may use this information to select a logical data container or a set of data objects that correspond to licensing servers in the same data region. The application may select a licensing server address data object from the object-based data storage service. In some embodiments, the application submits a request to the object-based data storage service to obtain a licensing server address data object. In response to the request, the object-based data storage service may select a licensing server address data object based at least in part on the criteria described above. Thus, the application may obtain 504 the data object from the object-based data storage service.

The application may evaluate the obtained licensing server address data object to identify the one or more network addresses specified therein. The application may select 506 a network address from the data object and attempt 508 to establish a communications channel (e.g., connection) with the licensing server corresponding to the selected network address. For instance, if the licensing server address data object includes a listing of network addresses for a subset of the licensing servers available, the application may select any network address specified in the licensing server address data object. Alternatively, the application may select a network address at random. The application may submit an application layer (e.g., HyperText HTTPS, file transfer protocol, etc.) request to the selected licensing server to establish a secure network communications channel, such as a TLS/SSL secure channel.

The application may determine 510 whether the selected licensing server is available for use in obtaining the software license. For instance, if the application establishes a communications channel with the selected licensing server, the application may submit a request to obtain 514 a software license that can be used to provide authenticated access to the features of the application to the user of the virtual machine instance or other computing resource. However, if the application is unable to establish a communications channel with the selected licensing server, such as through detection of a failure in the connection with the licensing server, the application determine 512 whether there are any other network addresses specified in the selected licensing server address data object that have not been used by the application. If there are no other network addresses available, the application may select another data object from the object-based data storage service. However, if there are other network addresses available for use, the application may select another network address from the licensing server address data object and attempt to establish a communications channel with the licensing server corresponding to the newly selected licensing server.

Figure 6:
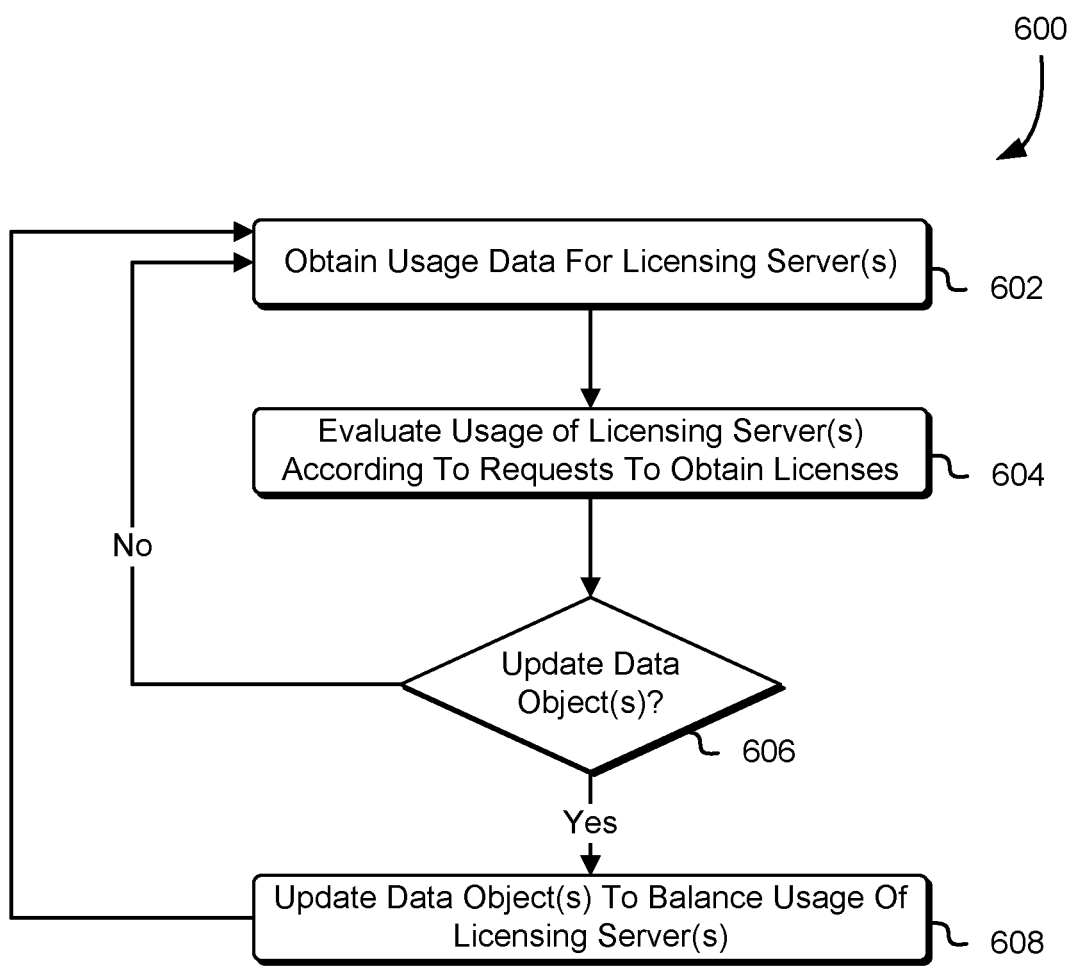
FIG. 6 shows an illustrative example of a process for updating one or more data objects based at least in part on usage data from licensing servers in accordance with at least one embodiment.

As noted above, the licensing server object generator may evaluate usage data for the licensing servers of a fleet of licensing servers to determine whether the licensing server address data objects are to be updated to balance the load across the licensing servers. For instance, if a licensing server experiences elevated usage, the licensing server object generator may modify the licensing server address data objects to decrease the number of instances whereby the network address of the affected licensing server is specified. This may lower the probability of the licensing server being selected for obtaining a software license. Accordingly, FIG. 6 shows an illustrative example of a process 600 for updating one or more data objects based at least in part on usage data from licensing servers in accordance with at least one embodiment. The process 600 may be performed by the aforementioned licensing server object generator, which may obtain the usage data from the myriad licensing servers and update the licensing server address data objects based at least in part on the obtained usage data.

At any time, the licensing server object generator may obtain 602 usage data from the fleet of licensing servers. For instance, the licensing server object generator may periodically query the licensing servers to obtain the individual usage data logs from the licensing servers. Alternatively, the licensing server object generator may access the usage data log corresponding to the fleet of licensing servers to obtain the usage data for the licensing servers. In some instances, the licensing server object generator may obtain the usage data in response to a triggering event. For instance, if the licensing server object generator detects that a licensing server is inoperative or is experiencing unusual latency in responding to requests to obtain a software license, the licensing server object generator may obtain the usage data for the licensing servers.

The licensing server object generator may evaluate 604 the obtained usage data to identify how the licensing servers are being utilized with regard to requests to obtain a particular software license or set of software licenses. Based at least in part on the evaluation of this usage data, the licensing server object generator may determine 606 whether to update the licensing server address data objects including the network addresses of the licensing servers. For example, if, based at least in part on the usage data, the licensing server object generator determines that a particular licensing server is being utilized at a rate greater than a maximum frequency threshold established by the computing resource service provider, the licensing server object generator may modify one or more licensing server address data objects to reduce the frequency at which the network address for the affected licensing server is specified in these data objects. This may include removing instances of the network address from the licensing server address data objects, moving the network address to a lower position in an ordering of network addresses within the data objects, and the like. Similarly, if a licensing server is underutilized (e.g., utilized at a rate less than a minimum threshold frequency defined by the computing resource service provider), the licensing server object generator may increase the number of instances the network address for the licensing server is specified in the data objects. Thus, the licensing server object generator may update 608 these data objects to balance the usage or load of the licensing servers. In some embodiments, the licensing server object generator may update the licensing server address data objects in response to other triggers. For instance, if a licensing server is removed from service due to an issue impacting the performance of the licensing server, due to a scheduled maintenance cycle for the licensing server, due to an upgrade of the licensing server, and the like, the licensing server object generator may update 608 the data objects to compensate for the offline or otherwise impaired licensing server.

If the licensing server object generator determines that the licensing server address data objects are not to be updated (e.g., usage for the licensing servers is balanced or within acceptable tolerances), the licensing server object generator may obtain new usage data for the licensing servers at any time or in response to a triggering event to determine whether an update of the data objects is needed. Similarly, once the licensing server object generator has updated the data objects to balance the load among the licensing servers of the fleet, the licensing server object generator may obtain, at any time or in response to a triggering event, new usage data for the licensing servers. This may enable the licensing server object generator to continuously evaluate usage data for the licensing servers and update the licensing server address data objects to maintain a balanced load among the licensing servers.

Figure 7:
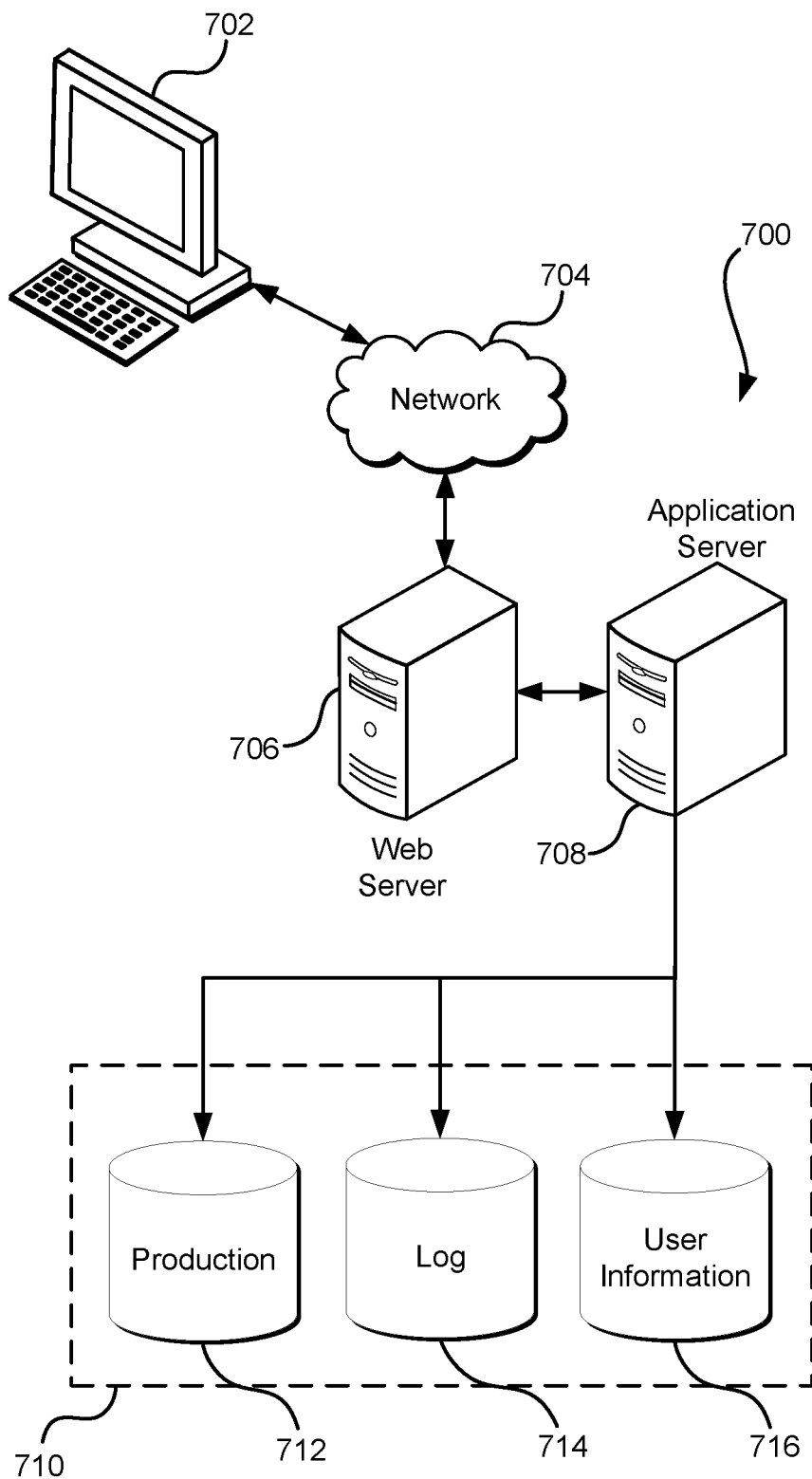
FIG. 7 shows an illustrative example of an environment in which various embodiments can be implemented.

FIG. 7 illustrates aspects of an example environment 700 for implementing aspects in accordance with various embodiments. As will be appreciated, although a web-based environment is used for purposes of explanation, different environments may be used, as appropriate, to implement various embodiments. The environment includes an electronic client device 702, which can include any appropriate device operable to send and/or receive requests, messages, or information over an appropriate network 704 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 702 and the application server 708, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 710 can include several separate data tables, databases, data documents, dynamic data storage schemes, and/or other data storage mechanisms and media for storing data relating to a particular aspect of the present disclosure. For example, the data store illustrated may include mechanisms for storing production data 712 and user information 716, which can be used to serve content for the production side. The data store also is shown to include a mechanism for storing log data 714, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update, or otherwise process data in response thereto. The application server 708 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 702. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM®, as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory, or other memory technology, Compact Disc Read-Only Memory ("CD-ROM"), digital versatile disk (DVD), or other optical storage, magnetic cassettes, magnetic tape, magnetic disk storage, or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

What is claimed is:

1. A computer-implemented method, comprising:
    initiating execution of an application on a computer system, the application comprising a feature accessible through use of a software license;
    determining a set of licensing servers to provide the software license, wherein a size of the set of licensing servers is determined based at least in part on a number of installed instances of the application;
    generating a set of data objects that include network addresses of the set of licensing servers;
    obtaining a data object of the set of data objects, the data object specifying a set of network addresses of one or more of the set of licensing servers;
    selecting, from the data object, a network address of a licensing server;
    using the network address to establish a communications channel with the licensing server; and
    obtaining, from the licensing server, the software license to enable use of the feature.

2. The computer-implemented method of claim 1, wherein the set of network addresses of the set of licensing servers specified in the data object is distinct from other sets of network addresses specified in other data objects of the set of data objects.

3. The computer-implemented method of claim 1, further comprising:
    initiating execution of a second application of the computer system, the second application comprising a second feature accessible through use of a second software license;
    obtaining an additional data object from a second set of data objects specifying network addresses of second licensing servers for providing the second software license, the second data object specifying a subset of the network addresses of the second licensing servers;
    selecting, from the second data object, a network address of a second licensing server;
    determining failure to establish a connection with the second licensing server;
    selecting, from the second data object, another network address of another licensing server; and
    obtaining, from the second licensing server, the second software license to enable use of the second feature.

4. The computer-implemented method of claim 1, wherein the data object is obtained by selecting the data object from the set of data objects at random.

5. A system, comprising:
    one or more processors; and
    memory that stores computer-executable instructions that, if executed, cause the one or more processors to:
        determine a set of servers to provide a license for accessing a feature of an application, wherein a size of the set of servers is determined based at least in part on a number of installed instances of the application;
        identify network addresses for the set of servers;
        generate a plurality of data records, wherein individual data records of the plurality of data records specify a subset of the network addresses for the plurality of servers; and
        make the plurality of data records available to a computer system running the application.

6. The system of claim 5, wherein the instructions further cause the one or more processors to:
    obtain usage data for the set of servers, the usage data specifying a frequency at which requests to obtain the license are received by individual servers of the set of servers;
    determine, based on the usage data, that future requests are to be redistributed away from one of the set of servers; and
    modify the plurality of data records to redistribute the requests away from the one of the set of servers.

7. The system of claim 6, wherein the instructions further cause the one or more processors to remove an entry for a network address of the one of the set of servers from the plurality of data records.

8. The system of claim 6, wherein the instructions further cause the one or more processors to add an entry corresponding to a network address of another server to the plurality of data records.

9. The system of claim 5, wherein the instructions further cause the one or more processors to:
    determine that a server has been added to the set of servers;
    obtain a network address of the server; and
    modify a subset of the plurality of data records to specify at least one entry corresponding to the network address of the server.

10. The system of claim 5, wherein the instructions further cause the one or more processors to:
    generate metadata to specify identifiers of the plurality of data records; and
    make the metadata available to the computer system running the application such that the metadata is usable to select a data record from the plurality of data records.

11. The system of claim 5, wherein the instructions further cause the one or more processors to:
    determine, for the set of servers, data regions in which the set of servers are operating; and
    store individual data records of the plurality of data records according to the data regions in which the set of servers are operating.

12. The system of claim 5, wherein the instructions further cause the one or more processors to:
    obtain usage data for the set of servers, the usage data specifying a frequency at which requests to obtain the license are received by individual servers of the set of servers;
    determine, based on the usage data, that future requests are to be redistributed at a greater frequency to a particular server of the set of servers; and generate a data record specifying a network address of the particular server to increase the frequency at which the particular server is receiving the requests.

13. A non-transitory computer-readable storage medium storing thereon executable instructions that, as a result of being executed by one or more processors of a computer system, cause the computer system to at least:
   determine a plurality of servers to provide an authorization for accessing a feature of an application, wherein a size of the plurality of servers is determined based at least in part on a number of installed instances of the application;
   identify network addresses usable to access the plurality of servers; and
   store a plurality of data records in a location accessible to computing resources that use the application, wherein individual data records of the plurality of data records specify a subset of the network addresses.

14. The non-transitory computer-readable storage medium of claim 13, wherein the location is a storage service.

15. The non-transitory computer-readable storage medium of claim 13, wherein the instructions further cause the computer system to:
   obtain usage data for the plurality of servers;
   determine, based on the usage data, that a server is being utilized at a frequency greater than a maximum threshold frequency; and
   modify a subset of the plurality of data records to reduce the frequency at which the server is being utilized.

16. The non-transitory computer-readable storage medium of claim 15, wherein the instructions that cause the computer system to modify the subset of the plurality of data records further include instructions that cause the computer system to remove entries corresponding to a network address of the server from the subset of the plurality of data records.

17. The non-transitory computer-readable storage medium of claim 15, wherein the instructions that cause the computer system to modify the subset of the plurality of data records further include instructions that cause the computer system to add at least one entry corresponding to a network address of another server to the subset.

18. The non-transitory computer-readable storage medium of claim 13, wherein the instructions further cause the computer system to:
   receive a request to obtain a data record;
   identify, based on usage data for the plurality of data records, a data record having a lower frequency of usage compared to other data records of the plurality of data records; and
   provide the identified data record to fulfill the request.

19. The non-transitory computer-readable storage medium of claim 13, wherein the instructions further cause the computer system to:
   obtain usage data for the plurality of data records;
   determine, based on the usage data, that a server is receiving requests to obtain the authorization at a rate lower than a minimum threshold frequency; and
   modify a subset of the plurality of data records to increase the rate at which the server is receiving the requests.

20. The non-transitory computer-readable storage medium of claim 13, wherein the instructions further cause the computer system to:
   detect that a server has been added to the plurality of servers;
   obtain a network address of the added server; and
   modify a subset of the plurality of data records to specify the network address of the added server.

* * * * *